United States Patent
Ohara et al.

(10) Patent No.: US 10,940,695 B2
(45) Date of Patent: Mar. 9, 2021

(54) PRINTING APPARATUS AND PRINTING METHOD

(71) Applicant: MIMAKI ENGINEERING CO., LTD., Nagano (JP)

(72) Inventors: Eiichi Ohara, Nagano (JP); Akira Takatsu, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/790,774

(22) Filed: Feb. 14, 2020

(65) Prior Publication Data

US 2020/0180323 A1 Jun. 11, 2020

Related U.S. Application Data

(63) Continuation of application No. 16/061,342, filed as application No. PCT/JP2016/087291 on Dec. 14, 2016, now Pat. No. 10,596,822.

(30) Foreign Application Priority Data

Dec. 16, 2015 (JP) ................................. 2015-245020

(51) Int. Cl.
| | |
|---|---|
| *B41J 2/01* | (2006.01) |
| *B41J 2/205* | (2006.01) |
| *B41J 2/21* | (2006.01) |
| *B41J 2/52* | (2006.01) |

(Continued)

(52) U.S. Cl.
CPC ............. *B41J 2/205* (2013.01); *B41J 2/2054* (2013.01); *B41J 2/21* (2013.01); *B41J 2/2132* (2013.01); *B41J 2/52* (2013.01); *B41J 2/525* (2013.01); *G06K 15/107* (2013.01); *G06K 2215/0094* (2013.01)

(58) Field of Classification Search
None
See application file for complete search history.

(56) References Cited

U.S. PATENT DOCUMENTS

| | | | |
|---|---|---|---|
| 2011/0075174 A1* | 3/2011 | Kajihara | B41J 2/2132 358/1.9 |
| 2014/0210888 A1* | 7/2014 | Muller | B41J 2/2132 347/14 |

* cited by examiner

*Primary Examiner* — Erica S Lin
*Assistant Examiner* — Tracey M McMillion
(74) *Attorney, Agent, or Firm* — JCIPRNET

(57) ABSTRACT

The present disclosure prevents a visible pattern corresponding to the pattern of a mask from being noticeable and enables more appropriate printing. A printing apparatus 10 performing printing by an inkjet scheme includes: an inkjet head 102; and a controller 20, configured to control the operation of a main scan driver 16 and a sub scan driver 18 to perform a main scanning operation multiple times on each position on a medium 50. In the main scanning operation, for at least part of ejection positions serving as ejection targets of ink droplets in the main scanning operation, the controller 20 causes the inkjet head 102 to eject an ink droplet in accordance with a mask for selecting part of the at least part of ejection positions. In the main scanning operation at one time, the controller 20 causes the inkjet head 102 to eject an ink droplet in accordance with a preset first mask. In the main scanning operation at another time different from the one time, the controller 20 causes the inkjet head 102 to eject an ink droplet in accordance with a second mask for selecting an ejection position in a pattern different from the first mask.

9 Claims, 11 Drawing Sheets

(51) Int. Cl.
*B41J 2/525* (2006.01)
*G06K 15/10* (2006.01)

- RESOLUTION PASS=4

(FEED DIRECTION 2 x SCAN DIRECTION 2)

EJECTION POSITION: FOUR PATTERNS OF a TO d

| b | d | b | d |
  |---|---|---|---|
  | a | c | a | c |
  | b | d | b | d |
  | a | c | a | c |

FIG. 5(a)

- PRINTING IN 8 PASSES (EJECTION POSITIONS a TO d EACH ARE FILLED BY TWO PASSES)

| 2 | 4 | 6 | 8 | 2 | 4 | 6 | 8 | 2 | 4 | 6 | 8 |
  |---|---|---|---|---|---|---|---|---|---|---|---|
  | 1 | 3 | 5 | 7 | 1 | 3 | 5 | 7 | 1 | 3 | 5 | 7 |
  | 2 | 4 | 2 | 8 | 2 | 4 | 2 | 8 | 2 | 4 | 2 | 8 |
  | 5 | 7 | 1 | 3 | 5 | 7 | 1 | 3 | 5 | 7 | 1 | 3 |
  | 6 | 8 | 6 | 4 | 6 | 8 | 6 | 4 | 6 | 8 | 6 | 4 |
  | 5 | 3 | 1 | 7 | 5 | 3 | 1 | 7 | 5 | 3 | 1 | 7 |
  | 2 | 4 | 6 | 8 | 2 | 4 | 6 | 8 | 2 | 4 | 6 | 8 |
  | 1 | 3 | 5 | 7 | 1 | 3 | 5 | 7 | 1 | 3 | 5 | 7 |

FIG. 5(b)

- MASK PATTERN

| A | | B | | C | | D | |
  |---|---|---|---|---|---|---|---|
  | 1 | 2 | 1 | 2 | 1 | 2 | 2 | 1 |
  | 2 | 1 | 1 | 1 | 2 | 1 | 2 | 1 |
  | 2 | 1 | 2 | 2 | 1 | 2 | 1 | 2 |

NUMERAL INDICATES IN WHICH PASS INK IS EJECTED
  CONFIGURATION IS DECOMPOSED AS BELOW

FIRST TIME 

SECOND TIME 

A: USED FOR EJECTION POSITION a
  B: USED FOR EJECTION POSITION b
  C: USED FOR EJECTION POSITION c
  D: USED FOR EJECTION POSITION d

FIG. 5(c)

- PRINTING IN 12 PASSES
  (EJECTION POSITIONS a TO d EACH ARE FILLED
  BY THREE PASSES)
| 2 | 8 | 10 | 12 | 2 | 8 | 10 | 12 | 2 | 8 | 10 | 12 |
|---|---|----|----|---|---|----|----|---|---|----|----|
| 1 | 7 | 9  | 3  | 1 | 7 | 9  | 3  | 1 | 7 | 9  | 3  |
| 2 | 12| 10 | 4  | 2 | 12| 10 | 4  | 2 | 12| 10 | 4  |
| 5 | 11| 1  | 7  | 5 | 11| 1  | 7  | 5 | 11| 1  | 7  |
| 6 | 4 | 6  | 8  | 6 | 4 | 6  | 8  | 6 | 4 | 6  | 8  |
| 9 | 3 | 5  | 11 | 9 | 3 | 5  | 11 | 9 | 3 | 5  | 11 |
| 2 | 8 | 10 | 12 | 2 | 8 | 10 | 12 | 2 | 8 | 10 | 12 |
| 1 | 7 | 9  | 3  | 1 | 7 | 9  | 3  | 1 | 7 | 9  | 3  |
FIG. 6(a)
- MASK PATTERN
| A | B | C | D |
|---|---|---|---|
| 1 3 / 2 1 / 3 2 | 1 3 / 1 3 / 2 2 | 2 1 / 3 2 / 1 3 | 2 3 / 3 1 / 1 2 |
NUMERAL INDICATES IN WHICH PASS INK IS EJECTED
CONFIGURATION IS DECOMPOSED AS BELOW
FIRST TIME 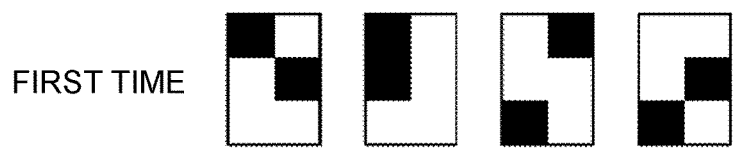
SECOND TIME 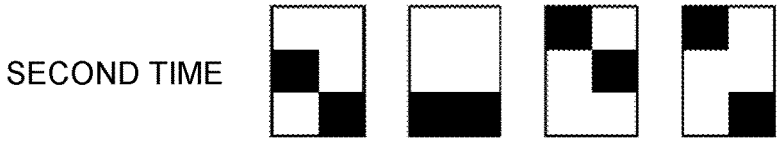
THIRD TIME 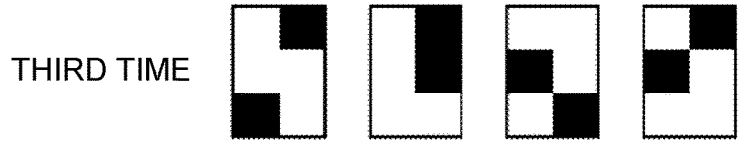
A: USED FOR EJECTION POSITION a
B: USED FOR EJECTION POSITION b
C: USED FOR EJECTION POSITION c
D: USED FOR EJECTION POSITION d
FIG. 6(b)

•RESOLUTION PASS=3
(FEED DIRECTION 3 x SCAN DIRECTION 1)

EJECTION POSITION:THREE PATTERNS OF a TO c

• PRINTING IN 6 PASSES
(EJECTION POSITIONS a TO c EACH ARE FILLED BY TWO PASSES)

• MASK PATTERN

NUMERAL INDICATES IN WHICH PASS INK IS EJECTED
CONFIGURATION IS DECOMPOSED AS BELOW

FIRST TIME

SECOND TIME

MASK A

MASK A

MASK B: OBTAINED BY SHIFTING MASK A LATERALLY BY 85 PIXELS
MASK C: OBTAINED BY SHIFTING MASK A LATERALLY BY 170 PIXELS

PRINTING APPARATUS AND PRINTING METHOD

CROSS REFERENCE TO RELATED APPLICATIONS

This application is a continuation of and claims the priority benefit of U.S. application Ser. No. 16/061,342, filed on Jun. 12, 2018, now allowed, which also is a 371 application of the International PCT application serial no. PCT/JP2016/087291, filed on Dec. 14, 2016, which claims the priority benefits of Japan Patent Application No. 2015-245020, filed on Dec. 16, 2015. The entirety of each of the above-mentioned patent applications is hereby incorporated by reference herein and made a part of this specification.

TECHNICAL FIELD

The present invention relates to a printing apparatus and a printing method.

BACKGROUND ART

Inkjet printers that perform printing by an inkjet scheme have been widely used (see Patent Literature 1). As a method of performing printing with an inkjet printer, the multi-pass method has been widely used, in which a main scanning operation is performed multiple times on each position on a medium.

CITATION LIST

Patent Literature

Patent Literature 1: Japanese Unexamined Patent Application Publication No. 2008-273184

SUMMARY

Technical Problem

In printing by the multi-pass method, in each main scanning operation, ink droplets are typically ejected to part of ejection positions in a region through which an inkjet head passes in the main scanning operation. In this case, the ejection positions to which ink droplet are ejected are selected in accordance with a mask having a preset pattern, that is, mask data.

In this case, a visible pattern corresponding to the pattern of a mask is printed in each main scanning operation. In the multi-pass method, the main scanning operation is performed multiple times on each position on a medium as described above. Then, in this case, the identical visible patterns overlap so as to be shifted in position from each other, and the visible pattern corresponding to the pattern of the mask tends to be noticeable.

In particular, when high-resolution printing is performed, the size of a mask is small relative to the area to be printed. This makes the visible pattern of the mask noticeable. Moreover, when the feed amount in the sub scanning operation is small, for example, when the number of passes of printing is large, the identical visible patterns overlap so as to be slightly shifted from each other. This makes the visible pattern of the mask noticeable. For example, when solid printing is performed to fill a certain area, the visible pattern of the mask is particularly noticeable.

Unfortunately, when the visible pattern of the mask is noticeable in the print result, the quality of printing is reduced. It has been therefore desired to prevent the visible pattern corresponding to the pattern of the mask from being noticeable and to perform printing more appropriately. The present invention is then aimed to provide a printing apparatus and a printing method that can solve the problem above.

Patent Literature 1 above discloses a configuration in which, for example, mask patterns exclusive to each other are used for a plurality of achromatic inks. However, the object of the invention and the specific configuration differ from those of the present invention.

Solutions to the Problems

In order to solve the problem above, the present invention provides a printing apparatus configured to perform printing on a medium by an inkjet scheme. The printing apparatus includes: an inkjet head, configured to eject an ink droplet by the inkjet scheme; a main scan driver, configured to cause the inkjet head to perform a main scanning operation of ejecting an ink droplet while moving relative to the medium in a preset main scanning direction; a sub scan driver, configured to cause the inkjet head to perform a sub scanning operation of moving relative to the medium in a sub scanning direction orthogonal to the main scanning direction; and a controller, configured to control operation of the main scan driver and the sub scan driver to perform the main scanning operation multiple times on each position on the medium. In the main scanning operation, for at least part of ejection positions serving as ejection targets of ink droplets in the main scanning operation, the controller causes the inkjet head to eject an ink droplet, in accordance with a mask configured to select part of the at least part of ejection positions, to an ejection position specified by the mask. In the main scanning operation at one time, the controller causes the inkjet head to eject an ink droplet in accordance with a preset first mask. In the main scanning operation at another time different from the one time, the controller causes the inkjet head to eject an ink droplet in accordance with a second mask configured to select an ejection position in a pattern different from that of the first mask.

In this configuration, different masks are used for different main scanning operations, so that the occurrence of a visible pattern corresponding to the pattern of a mask in the print result can be prevented appropriately compared with when the same mask is used for all the main scanning operations using a single mask. This also can prevent the visible pattern corresponding to the pattern of the mask from being the noticeable and enables more appropriate printing.

In this configuration, the inkjet head includes a nozzle row including a plurality of nozzles arranged in the sub scanning direction. In each main scanning operation, the controller causes each nozzle in the nozzle row in the inkjet head to eject an ink droplet in accordance with the pattern of the mask. In this case, causing the inkjet head to eject ink droplets to the ejection positions specified by the mask means that the ejection position to which an ink droplet is ejected from each nozzle is set to the ejection position specified by the mask.

According to another aspect of the present invention, a printing method having the same features as described above may be provided. Also in this case, the similar effects to those described above can be achieved.

Effect of the Invention

The present invention prevents the visible pattern corresponding to the pattern of a mask from being noticeable and enables more appropriate printing.

DESCRIPTION OF THE DRAWINGS

FIGS. 1(a) to 1(c) illustrate an example of a printing apparatus 10 according to an embodiment of the present invention, in which FIG. 1(a) illustrates an exemplary configuration of the main part of the printing apparatus 10, FIG. 1(b) illustrates an exemplary configuration of a head 12 in the printing apparatus 10, and FIG. 1(c) illustrates an exemplary configuration of an inkjet head 102 in the head 12.

FIGS. 2(a) and 2(b) are diagrams illustrating an example of the operation in the multi-pass method, in which FIG. 2(a) illustrates an example of ejection positions to which ink droplets can be ejected in one main scanning operation, and FIG. 2(b) illustrates an example of a row of dots 302 of ink formed by the multi-pass method.

FIGS. 3(a) and 3(b) are diagrams illustrating an example of the printing operation in the multi-pass method in a conventional configuration, in which FIG. 3(a) illustrates an exemplary configuration of the inkjet head 102 and an example of ejection positions to which ink droplets are ejected from the inkjet head 102 during main scanning operation, and FIG. 3(b) illustrates an example of printing operation by the multi-pass method performed using a mask.

FIGS. 5(a) to 5(c) are diagrams illustrating a specific example of printing operation performed in the printing apparatus 10, in which FIG. 5(a) illustrates an example of the resolution pass number, FIG. 5(b) illustrates an example of ejection positions to which ink droplets are ejected in each main scanning operation when printing is performed in eight passes, and FIG. 5(c) is a diagram illustrating an example of the patterns of masks.

FIGS. 6(a) and 6(b) are diagrams illustrating another specific example of printing operation performed in the printing apparatus 10, in which FIG. 6(a) illustrates an example of ejection positions to which ink droplets are ejected in each main scanning operation when printing is performed in 12 passes, and FIG. 6(b) is a diagram illustrating an example of the patterns of masks.

FIGS. 7(a) to 7(c) are diagrams illustrating another specific example of printing operation performed in the printing apparatus 10, in which FIG. 7(a) illustrates an example of the resolution pass number, FIG. 7(b) illustrates an example of ejection positions to which ink droplets are ejected in each main scanning operation when printing is performed in six passes, and FIG. 7(c) is a diagram illustrating an example of the patterns of masks.

FIGS. 8(a) and 8(b) are diagrams illustrating an example of the result of printing performed by the multi-pass method in a conventional configuration, in which FIG. 8(a) illustrates an example of the print result, and FIG. 8(b) illustrates a mask that is a mask A used in this printing operation.

FIGS. 9(a) and 9(b) are diagrams illustrating an example of the result of printing performed by the multi-pass method with the printing apparatus 10 in this example, in which FIG. 9(a) illustrates an example of the print result, and FIG. 9(b) is a diagram illustrating a mask used in this printing operation.

FIGS. 10(a) to 10(c) are diagrams illustrating the number of passes that is an integer and the number of passes that is a non-integer, in which FIG. 10(a) is a diagram illustrating an example of the operation in which the number of passes is an integer, and FIGS. 10(b) and 10(c) illustrate an example of the operation in which the number of passes is a non-integer.

DESCRIPTION OF EMBODIMENT

Figure 1A:
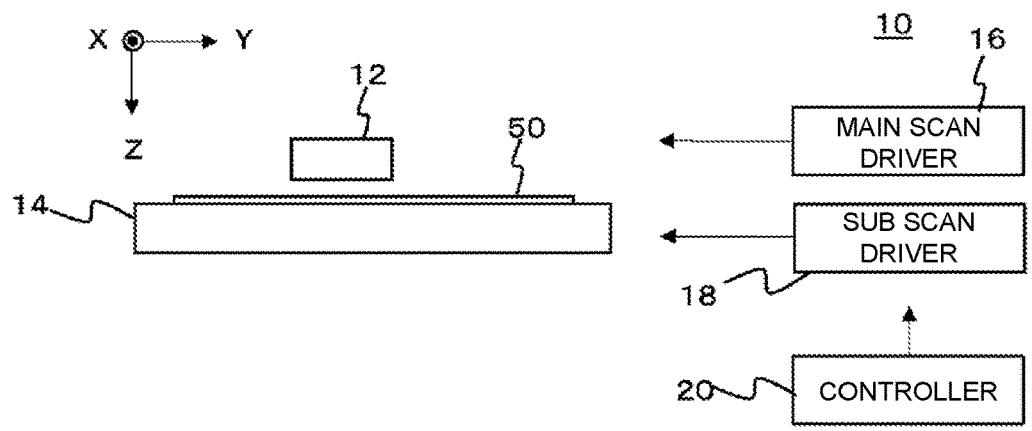
Figure 1B:
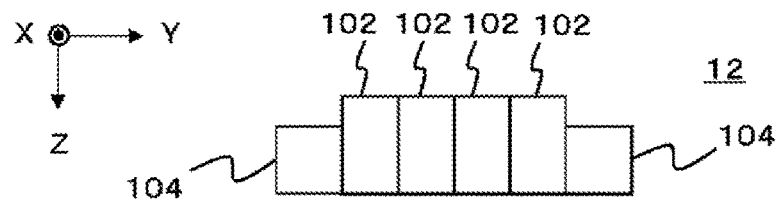
Figure 1C:
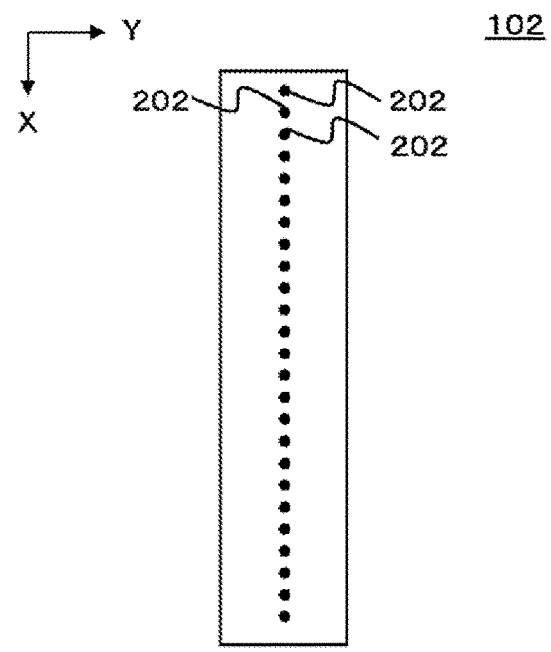

Embodiments of the present invention will be described below with reference to the drawings. FIGS. 1(a) to 1(c) illustrate an example of a printing apparatus 10 according to an embodiment of the present invention. FIG. 1(a) illustrates an exemplary configuration of the main part of the printing apparatus 10. FIG. 1(b) illustrates an exemplary configuration of a head 12 in the printing apparatus 10. FIG. 1(c) illustrates an exemplary configuration of an inkjet head 102 in the head 12.

The printing apparatus 10 in this example may have the same or similar configuration as known inkjet printers, except for the points described below. The printing apparatus 10 may further include a variety of known components necessary for printing operation, in addition to the components illustrated in the figures.

The printing apparatus 10 is an inkjet printer that performs printing on a medium 50 to be printed by an inkjet scheme. The printing apparatus 10 includes the head 12, a platen 14, a main scan driver 16, a sub scan driver 18, and a controller 20. In this example, the printing apparatus 10 performs printing on the medium 50 using ultraviolet (UV) curable ink that hardens by ultraviolet radiation. In a modification of the configuration of the printing apparatus 10, the printing apparatus 10 may perform printing using an ink other than UV curable ink. In this case, it is preferable to change a specific configuration of the printing apparatus 10 as appropriate according to the ink to be used.

The head 12 is a part configured to eject ink droplets to the medium 50. In this example, the head 12 includes a plurality of inkjet heads 102 and a plurality of fixing devices 104. The inkjet heads 102 and the fixing devices 104 are disposed side by side in the main scanning direction that is the preset Y direction in the figure and is the scan direction, as illustrated in FIG. 1(b).

A plurality of inkjet heads are print heads configured to eject ink droplets in an inkjet scheme. In this example, a plurality of inkjet heads eject ink droplets of colors different from each other. More specifically, a plurality of inkjet heads 102 each eject ink droplets of a color for color printing, such as yellow (Y), magenta (M), cyan (C), and black (K).

Each inkjet head 102 has a nozzle row in which a plurality of nozzles 202 are arranged in a row to eject ink droplets, as illustrated in FIG. 1(c). More specifically, in the nozzle row of the inkjet head 102, a plurality of nozzles 202 are arranged in a row in the sub scanning direction that is the X direction in the figure orthogonal to the main scanning direction and is the feed direction, with nozzle spacing that is constant nozzle pitch. During printing operation, the inkjet head 102 performs a main scanning operation of ejecting ink droplets while moving in the main scanning direction and thereby ejects an ink droplet from each nozzle 202 to the corresponding position on the medium 50.

The fixing devices 104 are devices for fixing, on the medium 50, ink ejected from the inkjet heads 102 to the medium 50. In this example, each of the fixing devices 104 is a light source configured to apply ultraviolet rays and applies ultraviolet rays to UV curable ink on the medium 50 to cure the ink and thereby fix the ink on the medium 50. More specifically, the fixing devices 104 are disposed on one side and the other side of a row of the inkjet heads 102 in the main scanning direction. Then, during main scanning operation, the fixing devices 104 on the back side in the moving direction of the inkjet heads 102 apply ultraviolet rays to the ink on the medium 50. With such a configuration, ink ejected in each main scanning operation can be fixed appropriately on the medium 50.

In a modification of the configuration of the printing apparatus 10, an ink other than UV curable ink may be used as described above. In this case, it is preferable that a configuration suitable for the characteristics of the ink used be used as the fixing device 104. When ink to be fixed on the medium 50 by drying is used, for example, a heater disposed in the platen 14 may be used as the fixing device 104.

The platen 14 is a stage-like member for holding a medium 50. The medium 50 is placed on the upper surface of the platen 14 at a position opposed to the head 12 so that the medium 50 is held to be opposed to the head 12. The main scan driver 16 is a driver that causes the inkjet heads 102 in the head 12 to perform the main scanning operation. In this example, the main scan driver 16 causes the entire head 12 to move in the main scanning direction to move the inkjet heads 102 in the main scanning direction. The main scan driver 16 also causes the moving inkjet head 102 to eject ink droplets from the nozzles 202 to cause the inkjet head 102 to perform the main scanning operation.

The sub scan driver 18 is a driver that causes the inkjet head 102 to perform a sub scanning operation of moving relative to the medium 50 in the sub scanning direction. In this example, the sub scan driver 18 moves the inkjet head 102 relative to the medium 50 by conveying the medium 50 in a conveyance direction parallel to the sub scanning direction. The sub scan driver 18 conveys the medium 50 in the interval between main scanning operations. Thus, the sub scan driver 18 shifts the position of the medium 50 opposed to the inkjet head 102 to change a region of the medium 50 to be subjected to the next main scanning operation. In a modification of the configuration of the printing apparatus 10, the sub scanning operation may be performed by fixing the position of the medium 50 and moving the head 12.

The controller 20 is a central processing unit (CPU) of the printing apparatus 10 and controls the operation of each unit of the printing apparatus 10. More specifically, the controller 20 causes the inkjet heads 102 to print a desired image on the medium 50 by controlling the operation of the main scan driver 16, the sub scan driver 18, and the like, based on image data representing an image to be printed.

In this example, the controller 20 further causes the inkjet heads 102 to perform printing by the multi-pass method, which is the multi-pass recording method, by controlling the operation of the main scan driver 16, the sub scan driver 18, and the like. The multi-pass method refers to a method of printing in which a main scanning operation is performed multiple times on each position on the medium 50. In this case, in each main scanning operation, the controller 20 causes the inkjet head 102 to eject ink droplets, in accordance with a mask that is preset mask data, to ejection positions specified by the mask. The mask refers to data for selecting part of ejection positions, of the ejection positions serving as ejection targets of ink droplets, in each main scanning operation.

In each main scanning operation, the controller 20 causes each nozzle 202 in the nozzle row in the inkjet head 102 to eject an ink droplet in accordance with the pattern of the mask. In this case, causing the inkjet head 102 to eject ink droplets to ejection positions specified by the mask means that the ejection position to which an ink droplet is ejected from each nozzle 202 is set to the ejection position specified by the mask.

The ejection position is a position on the medium 50 to which an ink droplet is to be ejected from the nozzle 202 of the inkjet head 102. This ejection position is a position corresponding to any one of a plurality of pixels forming an image to be printed. The ejection positions serving as ejection targets of ink droplets in each main scanning operation refer to the ejection positions to which ink droplets are ejected when the main scanning operation is performed such that ink droplets as many as possible are ejected without using a mask. The ejection position may be a target position to which an ink droplet is ejected.

According to this example, printing can be appropriately performed on a medium 50 through printing operation by the multi-pass method. The operation of the multi-pass method performed in this example will be described in more detail below.

FIGS. 2(*a*) to 4 are diagrams for explaining an example of the operation of the multi-pass method performed in this example. FIGS. 2(*a*) and 2(*b*) are diagrams illustrating an example of the operation in the multi-pass method, specifically, illustrating an example of the method of printing so as to obtain a resolution that is a desired print resolution in the multi-pass method. FIG. 2(*a*) illustrates an example of the ejection positions to which ink droplets can be ejected in one main scanning operation. The ejection positions to which ink droplets can be ejected in one main scanning operation means all of the ejection positions serving as ejection targets of ink droplets in one main scanning operation. All of the ejection positions means all of the ejection positions where ink droplets are ejected without selecting part of ejection positions using a mask.

In this case, in one main scanning operation, the inkjet head 102 illustrated in FIGS. 1(*a*) to 1(*c*) ejects ink droplets to ejection positions arranged with spacing according to the apparatus configuration and the settings of operation of the printing apparatus 10 in FIGS. 1(*a*) to 1(*c*), thereby forming dots 302 of ink arranged at regular intervals on the medium 50 illustrated in FIGS. 1(*a*) to 1(*c*). More specifically, when the nozzle spacing in the nozzle row of the inkjet head 102 is Lx0, dots 302 of ink formed by the nozzle row of the inkjet head 102 in one main scanning operation are arranged so as to be spaced apart from each other with the spacing Lx0 in the sub scanning direction that is the X direction.

During the main scanning operation, each nozzle in the inkjet head 102 ejects an ink droplet, in accordance with a periodic drive signal, in an ejection cycle corresponding to the cycle of the drive signal. Therefore, when ink droplets are ejected in succession in minimum cycles from each nozzle during the main scanning operation, each nozzle ejects ink droplets in preset ejection cycles.

During the main scanning operation, the inkjet head 102 moves in the main scanning direction at a predetermined speed. Therefore, in the dots 302 of ink formed in a row in the main scanning direction on the medium 50, the spacing between adjacent dots 302 in the main scanning direction is equal to the ejection cycle-corresponding spacing that is the distance corresponding to one cycle of the ejection cycles. More specifically, the ejection cycle-corresponding spacing is the product of the moving speed of the inkjet head 102 during the main scanning operation and the ejection period. In the example illustrated in the figure, the ejection cycle-corresponding spacing is Ly0.

In this way, when ink droplets are ejected to all of the ejection positions to which ink droplets can be ejected in one main scanning operation, the dots 302 of ink are arranged in a row at a predetermined resolution determined by the configuration of the printing apparatus 10 and the like. This resolution is hereinafter referred to as main-scanning resolution. As is clear from the foregoing, the main-scanning resolution is a resolution in which the spacing between pixels adjacent in the main scanning direction is equal to the ejection cycle-corresponding spacing Ly0, and the spacing between pixels adjacent in the sub scanning direction is equal to the nozzle spacing Lx0. The main-scanning resolution can be considered as the highest resolution in a row of dots 302 of ink that can be formed on the medium 50 by one inkjet head 102 in one main scanning operation.

Usually, recent printing apparatuses 10 are required to achieve a resolution higher than the main-scanning resolution, as a print resolution that is the resolution at the time of completion of printing. In this case, in the printing apparatus 10, the controller 20 in FIGS. 1(a) to 1(c) causes the inkjet head 102 to perform printing by the multi-pass method to perform printing at a print resolution higher than the main-scanning resolution.

Figure 2A:
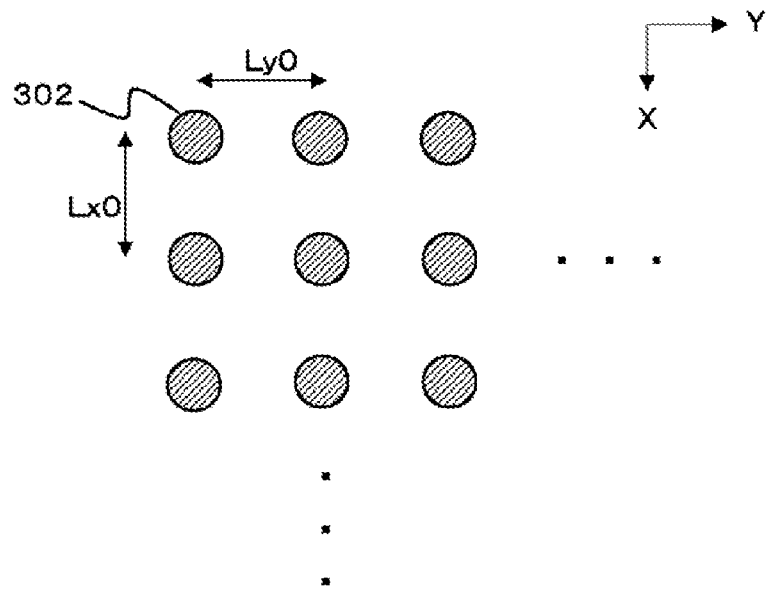
Figure 2B:
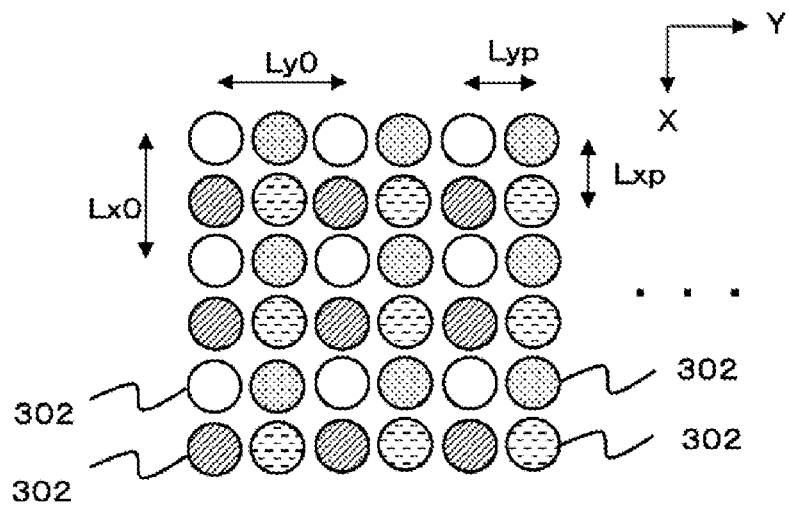

FIG. 2(b) illustrates an example of rows of dots 302 of ink formed by the multi-pass method. As described above, in one main scanning operation, the inkjet head 102 ejects ink droplets from the nozzles of the nozzle row to form a row of dots 302 of ink at the main-scanning resolution. In this case, in a plurality of main scanning operations performed on the same position in the multi-pass method, ink droplets are ejected such that the ejection positions are shifted from each other by a distance smaller than the inter-dot distance in the main-scanning resolution. This enables printing at a print resolution higher than the main-scanning resolution. In this case, shifting the ejection positions by a distance smaller than the inter-dot distance in the main-scanning resolution means that the ejection positions are shifted by a distance smaller than the ejection cycle-corresponding spacing Ly0 in the main scanning direction, or that the ejection positions are shifted by a distance smaller than the nozzle spacing Lx0 in the sub scanning direction, or both.

More specifically, FIG. 2(b) illustrates an example in which a print resolution higher than the main-scanning resolution is achieved by performing the main scanning operation four times. In this figure, the circles denoted by an identical hatching indicate dots 302 of ink that can be formed by one main scanning operation. Dots 302 of ink formed by different main scanning operations are denoted and identified by different hatchings.

As is clear from the figure, in this case, between dots 302 at the center of ink that can be formed in one main scanning operation, a dot 302 of ink is formed in another main scanning operation, so that the inter-dot distance in the main scanning direction and the sub scanning direction at the print resolution is half the inter-dot distance at the main-scanning resolution. This also increases the resolution in the main scanning direction and the sub scanning direction in the print resolution to twice the resolution in the main-scanning resolution. In other words, printing in the multi-pass method in this manner can appropriately increase the print resolution.

Here, when we think about generalizing the relation between the main-scanning resolution and the print resolution more broadly, the resolution in the main scanning direction and in the sub scanning direction may be set to a relation other than twice. For a plurality of pixels arranged in a row at the print resolution, when the spacing between pixels adjacent in the main scanning direction is main-scanning-direction print pixel spacing Lyp, and the spacing between pixels adjacent in the sub scanning direction is sub-scanning-direction print pixel spacing Lxp, the relation between the ejection cycle-corresponding spacing Ly0 and the main-scanning-direction print pixel spacing Lyp can be set such that the ejection cycle-corresponding spacing Ly0 is N times the main-scanning-direction print pixel spacing Lyp. Here, N is an integer equal to or greater than one. On the other hand, the relation between the nozzle spacing Lx0 and the sub-scanning-direction print pixel spacing Lxp can be set such that the nozzle spacing Lx0 is M times the sub-scanning-direction print pixel spacing Lxp. Here, M is an integer equal to or greater than one. In this case, in order to achieve a high print resolution in the multi-pass method, at least one of N and M may be set to an integer equal to or greater than two.

In this case, the number N×M can be considered as the number of print passes that is the minimum number of passes to be performed in order to obtain a desired print resolution. This number of passes N×M is hereinafter referred to as resolution pass number.

As described above, when only the purpose of achieving a print resolution higher than the main-scanning resolution is considered, the main scanning operation may be performed a number of times equal to the resolution pass number, for each position of the medium 50. The multi-pass method, however, may be performed for a purpose other than achieving a print resolution.

More specifically, the print result may be affected if the nozzle row of the inkjet head 102 includes a nozzle of which ejection characteristics greatly vary or a nozzle with poor ejection. In this case, if all of the dots 302 of ink corresponding to the main-scanning resolution are formed in each main scanning operation, the proportion of dots 302 formed by one nozzle in a row of inks in the main scanning direction is high, and this has a significant effect on the print result.

Therefore, one of the methods used to perform high-quality printing is to eject ink droplets to part of ejection positions, rather than ejecting to all of the ejection positions, in each main scanning operation, for the purpose of equalizing the ejection characteristics of the nozzles. In this case, as explained above, in the printing apparatus 10, the controller 20 causes the inkjet head 102 to eject ink droplets, in accordance with a mask that is mask data, to ejection positions specified by the mask. In this case, the number of passes of printing is set greater than the resolution pass number, so that the inkjet head 102 ejects ink droplets to all of the ejection positions in accordance with the print resolution.

The printing operation in the multi-pass method using a mask will now be described in more detail. For convenience of explanation, the printing operation in the multi-pass method in a conventional configuration will be described first.

Figure 3A:
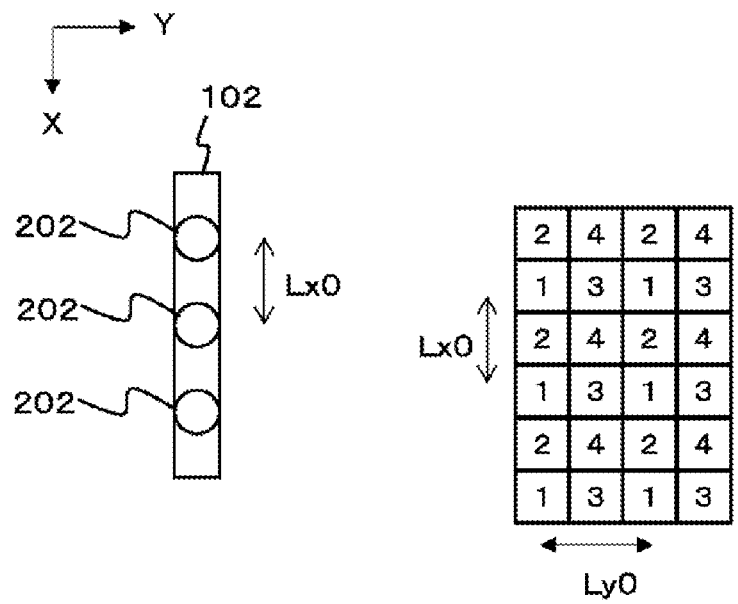
Figure 3B:
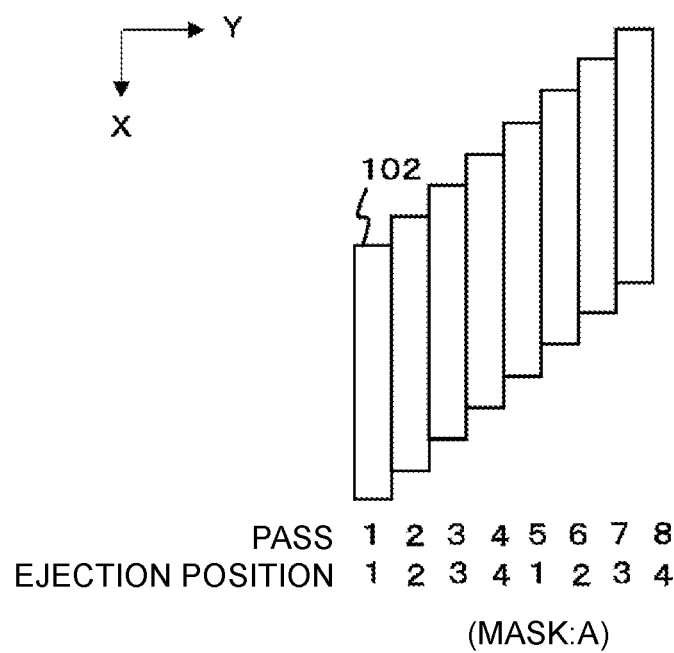

FIGS. 3(a) and 3(b) illustrate an example of the printing operation in the multi-pass method in a conventional configuration. FIG. 3(a) illustrates an exemplary configuration of the inkjet head 102 and an example of ejection positions to which ink droplets are ejected from the inkjet head 102 during main scanning operation. In FIG. 3(a), for simplicity of illustration, the configuration of the inkjet head 102 is represented by only three nozzles 202. These nozzles 202 are arranged in the sub scanning direction to be spaced apart from each other with constant nozzle spacing Lx0.

An example of the ejection positions is illustrated by rows of squares with numerals, on the right side of FIG. 3(a). The numeral in each square is a symbol for identifying the ejection position. More specifically, in the squares in FIG. 3(a), the squares with the same numeral indicate ejection positions spaced apart from each other by the dot spacing corresponding to the main-scanning resolution. The dot spacing corresponding to the main-scanning resolution refers to the dot spacing where the spacing in the main scanning direction is an integer multiple of the ejection cycle-corresponding spacing Ly0, and the spacing in the sub scanning direction is an integer multiple of the nozzle spacing Lx0. In this case, the adjacent squares with numerals different from each other indicate ejection positions spaced apart from each other by a distance smaller than the dot spacing corresponding to the main-scanning resolution.

The ejection positions with different numerals in the squares are the ejection positions to which ink droplets are unable to be ejected simultaneously in the same main scanning operation, in the same manner as different hatching patterns in the circles in FIG. 2(b). Therefore, in each main scanning operation, ink droplets can be ejected only to the ejection positions corresponding to the squares with the same numeral. That is, in this case, in each main scanning operation, ink droplets are ejected only to the ejection positions corresponding to the squares with any one of numerals 1 to 4.

In the squares illustrated in FIG. 3(a), any one of the squares, such as the square with numeral 1 on the top left side, can be considered as an example of the first ejection position. The square adjacent to the square considered as the first ejection position, such as the square with another numeral adjacent to the square with numeral 1, can be considered as an example of the second ejection position spaced apart from the first ejection position by a distance smaller than the inter-dot distance in the main-scanning resolution. In this case, the second ejection position may be a position spaced apart from the first ejection position by a distance smaller than the ejection cycle-corresponding spacing Ly0 in the main scanning direction. The second ejection position may be a position spaced apart from the first ejection position by a distance smaller than the nozzle spacing Lx0 in the sub scanning direction.

When printing is performed for such ejection positions by the multi-pass method with passes as many as the resolution pass number, ink droplets are ejected to ejection positions corresponding to the squares with the same numerals, of the ejection positions at the same location in the main scanning direction, in one main scanning operation. By contrast, when printing is performed using a mask by the multi-pass method with passes more than the resolution pass number, ink droplets are ejected to the ejection positions corresponding to the squares with the same numerals, through a plurality of separate main scanning operations.

FIG. 3(b) illustrates an example of printing operation in the multi-pass method performed using a mask. This figure illustrates an example of the operation in which the resolution pass number is four, and the number of passes is double, that is, eight.

In this case, as illustrated in the figure, the main scanning operation is repeated with the sub scanning operation interposed, so that the main scanning operation is performed, in total, eight times for each position on the medium 50. In each main scanning operation, ink droplets are ejected to any given ejection positions, of the ejection positions identified by numerals 1 to 4 in FIG. 3(a), in accordance with the position of the inkjet head 102 relative to the medium 50, the timing of a drive signal, and the like. More specifically, in the illustrated case, ink droplets are ejected to the ejection positions corresponding to numerals 1 to 4 in the first to fourth main scanning operations. Ink droplets are ejected to the ejection positions corresponding to numerals 1 to 4 again in the fifth to eighth main scanning operations.

Therefore, in this case, the main scanning operation is performed twice on the ejection position corresponding to each numeral. Then, in this case, in each main scanning operation, half the ejection positions are selected in accordance with the mask, compared with when printing is performed in only four passes which is as many as the resolution pass number. Such a configuration can reduce the proportion of dots formed by one nozzle 202 in a row of inks in the main scanning direction. In addition, this can appropriately suppress the effect on the print result caused by the ejection characteristics of individual nozzles 202 or other reasons.

When printing is performed by the multi-pass method in the conventional configuration, only one preset mask is typically used as a mask used in each main scanning operation. In the case illustrated in the figure, each main scanning operation is performed using a mask A alone as a preset mask. In this case, the mask A is a mask in which a pattern is set such that when the main scanning operation is performed multiple times with the sub scanning operation interposed with a predetermined feed amount, ink droplets can be ejected to ejection positions corresponding to dots arranged at the main-scanning resolution. The mask A may be a well-known mask.

When printing is performed in such a way, however, the mask having the same pattern is repeatedly used while being shifted in position step by step. Thus, the operation is such that identical visible patterns are printed in an overlapped manner, and the visible pattern corresponding to the pattern of the mask used may appear in the print result. In particular, when high-resolution printing is performed, the size of the mask is small relative to the area to be printed, and therefore, the visible pattern of the mask tends to be noticeable. When the feed amount in the sub scanning operation is small, for example, when the number of passes of printing is large, the visible pattern of the mask tends to be noticeable. In these cases, if solid printing is performed to fill a certain region, the visible pattern of the mask is particularly noticeable.

Figure 4:
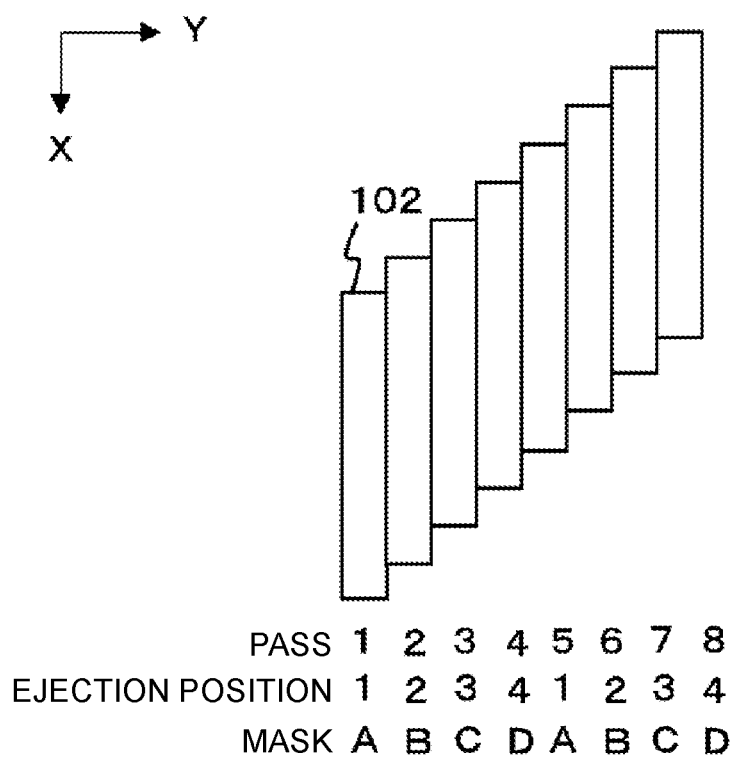
FIG. 4 is a diagram illustrating an example of printing operation by the multi-pass method performed by the printing apparatus 10 in this example.

By contrast, in the printing apparatus 10 illustrated in FIGS. 1(a) to 1(c) in this example, different kinds of masks are used to appropriately control such a problem. FIG. 4 illustrates an example of printing operation by the multi-pass method performed by the printing apparatus 10 in this example.

The printing operation performed in this example is the same or similar as the printing operation described with reference to FIGS. 3(a) and 3(b), except for the points described below. The printing apparatus 10 in this example also ejects ink droplets to the ejection positions identified by numerals 1 to 4 in FIG. 3(a), in the same or similar manner as in the case described with reference to FIGS. 3(a) and 3(b). In this case, the inkjet head 102 illustrated in FIGS. 1(a) to 1(c) in the printing apparatus 10 ejects ink droplets to targeted ejection positions, of the ejection positions identified by numerals 1 to 4 in FIG. 3(a), in each main scanning operation. More specifically, in the illustrated case, ink droplets are ejected to the ejection positions corresponding to numerals 1 to 4 in the first to fourth main scanning operations. In addition, ink droplets are ejected to the ejection positions corresponding to numerals 1 to 4 again in the fifth to eighth main scanning operations.

In the printing apparatus 10 in this example, unlike the case illustrated in FIGS. 3(a) and 3(b), a plurality of masks configured to select ejection positions in patterns different from each other are used as the masks used in each main scanning operation, rather than using only one mask, that is, the mask A. More specifically, in FIG. 4, the use of four kinds of masks A to D is illustrated.

According to this example, different masks are used for different main scanning operations to appropriately prevent the visible pattern corresponding to the pattern of the mask from appearing in the print result, compared with when only one mask is used and the same mask is used in every main scanning operation. More specifically, in this case, the distance to an overlap of the same visible pattern of the mask, that is, the distance in the sub scanning direction is increased, so that the effect of noticeable visible pattern is less likely to occur in the print result. This also prevents the visible pattern corresponding to the pattern of the mask from being noticeable and enables more appropriate printing.

In this example, different kinds of masks are not merely used but the same mask is used for the ejection positions corresponding to the squares with the same numeral. With such a configuration, when different kinds of masks are used, ink droplets can be ejected more easily and appropriately to all the ejection positions.

More specifically, as explained above, the pattern of a mask used in the multi-pass method is usually set such that when the main scanning operation is performed multiple times with the sub scanning operation interposed with a predetermined feed amount, ink droplets can be ejected to ejection positions corresponding to dots arranged in a row at the main-scanning resolution. That is, it can be said that the pattern of the mask is usually set such that a complementary relation that completes a row of dots of ink is established by the main scanning operation performed multiple times.

Therefore, when the mask is changed every time the main scanning operation is performed, simply changing the mask may fail to appropriately establish such a complementary relation. Moreover, complicated control may be necessary to establish the complementary relation.

By contrast, in this example, the same mask is used for ejection positions corresponding to the squares with the same numeral as described above. More specifically, the same mask A is used in the main scanning operations that are the first and fifth passes for ejecting ink droplets to the ejection positions corresponding to numeral 1. The same mask is used similarly in a plurality of main scanning operations for ejecting ink droplets to ejection positions corresponding to each of the other numerals.

Since the complementary relation as described above matters only to a plurality of main scanning operations for ejecting ink droplets to ejection positions corresponding to the squares with the same numeral, it does not matter if masks are different among main scanning operations for ejecting ink droplets to ejection positions corresponding to different numerals. Therefore, according to this example, the complementary relation as described above can be established easily and appropriately even when different kinds of masks are used. In addition, with this configuration, ink droplets can be ejected more easily and appropriately to all the ejection positions when different kinds of masks are used.

Here, when it is considered to generalize the feature of this example more broadly, the controller 20 illustrated in FIGS. 1(a) to 1(c) in the printing apparatus 10 causes the inkjet head 102 to eject an ink droplet in accordance with a preset first mask in the main scanning operation at one time and causes the inkjet head 102 to eject an ink droplet in accordance with a second mask that selects an ejection position in a pattern different from that of the first mask in the main scanning operation at another time different from the one time. As explained above, the squares denoted by numerals in FIG. 3(a) are examples of the first ejection position and the second ejection position. Therefore, this feature can be further considered as follows: when the main scanning operation is performed to eject an ink droplet to the first ejection position on the medium 50 illustrated in FIGS. 1(a) to 1(c), the inkjet head 102 ejects an ink droplet in accordance with the first mask, whereas when the main scanning operation is performed to eject an ink droplet to the second ejection position, the inkjet head 102 ejects an ink droplet in accordance with the second mask.

In this example, the ejection positions corresponding to the squares with the same numeral are the ejection positions spaced apart from each other by the inter-dot distance at the main-scanning resolution. Consider any given squares illustrated in FIG. 3(a) as the first ejection position and the second ejection position. Then it can be said that when the main scanning operation is performed to eject an ink droplet to an ejection position at a distance from the first ejection position in the main scanning direction by an integer multiple of the ejection cycle-corresponding spacing Ly0 and at a distance from the first ejection position in the sub scanning direction by an integer multiple of the nozzle spacing Lx0, the inkjet head 102 ejects an ink droplet in accordance with the first mask. On the other hand, it can be said that when the main scanning operation is performed to eject an ink droplet to the ejection position at a distance from the second ejection position in the main scanning direction by an integer multiple of the ejection cycle-corresponding spacing Ly0 and at a distance from the second ejection position in the sub scanning direction by an integer multiple of the nozzle spacing Lx0, the inkjet head 102 ejects an ink droplet in accordance with the second mask.

In this way, in this example, the same mask is used for ejection positions corresponding to the squares with the same numeral. This also implements a configuration that enables easier and more appropriate ejection of ink droplets to all ejection positions when different kinds of masks are used.

In this respect, it may be preferable to use as many kinds of masks as possible in order to prevent the visible pattern corresponding to the pattern of the mask from appearing in the print result. For this reason, it is preferable that different kinds of masks as many as the resolution pass number are used. With such a configuration, more kinds of masks can be appropriately used to such an extent that the complementary relation as described above for selecting ejection positions is not complicated.

More specifically, as explained in relation to FIGS. 2(a) and 2(b), when the resolution pass number is N×M based on the relation between the main-scanning resolution and the print resolution, it is preferable that N×M kinds of masks having patterns different from each other are used, and the inkjet head 102 ejects ink droplets in accordance with any one of N×M kinds of masks to the ejection positions specified by the mask, in each main scanning operation. In this case, in the main scanning operation performed N×M times in succession, N×M kinds of masks each may be used in order. In this case, N×M kinds of masks each may be used in order in the corresponding main scanning operation repeatedly in cycles of the N×M main scanning operations.

With such a configuration, many kinds of masks can be used appropriately without performing complicated control.

As described above, in this example, different kinds of masks having different patterns are used. In this case, different patterns of masks means that the arrangements of ejection positions to be selected are different. In this case, more specifically, the masks used as different kinds of masks may include a high-frequency mask including a high frequency pattern with a high spatial frequency and a low-frequency mask including a low frequency pattern with a low spatial frequency. In this case, the high-frequency mask refers to a pattern in which the spatial frequency of a row of ejection positions forming the pattern is closer to the high frequency side than the peak of a visual sensitivity function. The low-frequency mask refers to a pattern in which the spatial frequency of a row of ejection positions forming the pattern is closer to the low frequency side than the peak of a visual sensitivity function. The pattern in which the spatial frequency of a row of ejection positions is closer to the high frequency side or the low frequency side than the peak of a visual sensitivity function refers to the pattern in which the peak of the spatial frequency portion in the pattern is closer to the high frequency side or the low frequency side than the peak of a visual sensitivity function.

As different kinds of masks, masks obtained by shifting, that is, translating a predetermined pattern by distances different from each other may be used. Also in this case, by translating the pattern appropriately and sufficiently, a plurality of masks having patterns different from each other can be used appropriately. In this case, the direction of translation is preferably the main scanning direction. Such a configuration can more appropriately prevent overlapping of visible patterns caused by printing in the multi-pass method, among masks with different amounts of translation.

The ejection position to which an ink droplet is ejected in each main scanning operation (pass) may be changed in various ways, in addition to the case illustrated in FIG. 4. More specifically, when ink droplets are ejected to the ejection positions corresponding to numerals 1 to 4 in the first to fourth main scanning operations as illustrated in FIG. 4, the ejection positions in the fifth and subsequent main scanning operations may be differentiated from those in FIG. 4. In this case, it is preferable that the ejection positions are differentiated to such an extent that only the timing of ejecting an ink droplet from each nozzle is changed. More specifically, the ejection positions in the fifth to eighth main scanning operations can be changed to, for example, the order: 3, 4, 1, 2, the order: 3, 2, 1, 4, or the order: 1, 4, 3, 2.

The printing operation in the multi-pass method performed in the printing apparatus 10 in this example will now be described more specifically. FIGS. 5(*a*) to 5(*c*) are diagrams illustrating a specific example of the printing operation performed in the printing apparatus 10.

FIG. 5(*a*) illustrates an example of the resolution pass number. In the printing operation illustrated in FIGS. 5(*a*) to 5(*c*), the resolution pass number is four. More specifically, in this case, as for the ejection positions to which ink droplets are ejected in the printing apparatus 10, when focus is on the ejection positions spaced apart from each other by a distance smaller than the inter-dot distance at the main-scanning resolution, the ejection positions are configured, as illustrated by four patterns a to d in the figure, such that two ejection positions are arranged in a row in the sub scanning direction that is the feed direction and two ejection positions are arranged in a row in the main scanning direction that is the scan direction. In this case, ink droplets are ejected to the ejection positions a to d in different main scanning operations. In the printing operation, the printing apparatus 10 performs printing with passes more than the resolution pass number. More specifically, in the case illustrated in FIGS. 5(*a*) to 5(*c*), the printing apparatus 10 performs printing operation in eight passes.

FIG. 5(*b*) illustrates an example of ejection positions to which ink droplets are ejected in the main scanning operation that is each pass when printing is performed in eight passes. In the figure, the numeral in each square indicates that the ordinal number of the main scanning operation, meaning which pass is the main scanning operation of ejecting an ink droplet to the corresponding ejection position. More specifically, to the ejection position corresponding to the square with numeral 1, an ink droplet is ejected in the first main scanning operation, that is, in the first pass. To the ejection positions corresponding to the squares with numerals 2 to 8, ink droplets are ejected in the second to eighth main scanning operations, that is, in the second to eighth passes.

In this case, since the number of passes of printing is twice the resolution passes, ink droplets are ejected such that the ejection positions corresponding to a to d illustrated in FIG. 5(*a*) are filled by two main scanning operations. More specifically, in the case illustrated in FIG. 5(*b*), ink droplets are ejected to the ejection positions corresponding to the ejection position a in the first and fifth main scanning operations, that is, in the first pass and the fifth pass. Ink droplets are ejected to the ejection positions corresponding to the ejection position b in the second and sixth main scanning operations, that is, in the second pass and the sixth pass. Ink droplets are ejected to the ejection positions corresponding to the ejection position c in the third and seventh main scanning operations, that is, in the third pass and the seventh pass. Ink droplets are ejected to the ejection positions corresponding to the ejection position d in the fourth and eighth main scanning operations, that is, in the fourth pass and the eighth pass.

In this case, in order to perform the main scanning operation corresponding to the same ejection position separately multiple times, for each of a to d, a mask is used in each main scanning operation as described above. Ink droplets are ejected to part of the ejection positions specified by the mask, in accordance with the mask.

FIG. 5(*c*) is a diagram illustrating an example of the patterns of masks, that is, mask patterns. In the case illustrated in FIGS. 5(*a*) to 5(*c*), the masks having patterns A to D illustrated in the figure are used. In this case, each numeral illustrated on the upper side in FIG. 5(*c*) indicates in which pass, that is, main scanning operation an ink droplet is ejected. When the configuration thus denoted by numerals is decomposed, the ejection positions a to d to which ink droplets are ejected in the first and second main scanning operations have the patterns as illustrated on the lower side of FIG. 5(*c*). In this case, the masks A to D are used for the ejection positions a to d, respectively.

In such a configuration, the mask can be changed appropriately every time the main scanning operation is performed. For each of the ejection positions a to d, the same mask can be used appropriately in the main scanning operations corresponding to the same ejection position. Therefore, with such a configuration, a plurality of masks can be used appropriately while the complementary relation of the ejection position in a plurality of main scanning operations can be established easily and appropriately. This also can appropriately prevent the visible pattern corresponding to the pattern of the mask from appearing in the print result.

Here, in the operation illustrated in FIGS. 5(a) to 5(c), the resolution pass number is four, and the number of passes of printing is eight. However, when the resolution pass number is the same as in the case in FIG. 5(a), the number of passes of printing may be different from the one described above.

FIGS. 6(a) and 6(b) are diagrams illustrating another specific example of the printing operation performed in the printing apparatus 10, specifically, illustrating an example of the operation in which printing is performed in 12 passes. In this case, the resolution pass number is four, which is the same as in FIG. 5(a). Also in this case, ink droplets are ejected to the ejection positions a to d in different main scanning operations, as in the case illustrated in FIG. 5(a). The number of passes of printing differs from that in FIGS. 5(a) to 5(c) and is set to 12, namely, 12 passes as described above.

FIG. 6(a) illustrates an example of the ejection positions to which ink droplets are ejected in each main scanning operation that is pass, when printing is performed in 12 passes. Also in FIG. 6(a), the numeral in each square indicates the main scanning operation of ejecting an ink droplet to the corresponding ejection position, in the same manner as in FIG. 5(b).

In this case, since the number of passes of printing is three times the resolution pass, ink droplets are ejected to fill the ejection positions corresponding to a to d illustrated in FIG. 5(a) in the main scanning operation performed three times. More specifically, in the case illustrated in FIG. 6(a), ink droplets are ejected to the ejection positions corresponding to the ejection position a in the first, fifth, and ninth main scanning operations, that is, in the first pass, the fifth pass, and the ninth pass. Ink droplets are ejected to the ejection positions corresponding to the ejection position b in the second, sixth, and tenth main scanning operations, that is, in the second pass, the sixth pass, and the tenth pass. Ink droplets are ejected to the ejection positions corresponding to the ejection position c in the third, seventh, and eleventh main scanning operations, that is, the third pass, the seventh pass, and the eleventh pass. Ink droplets are ejected to the ejection positions corresponding to the ejection position d in the fourth, eighth, and twelfth main scanning operations, that is, the fourth pass, eighth pass, and the twelfth pass. Also in this case, in order to perform the main scanning operation corresponding to the same ejection position separately multiple times, for each of a to d, a mask is used in each main scanning operation.

FIG. 6(b) is a diagram illustrating an example of the patterns of masks. In the case illustrated in FIGS. 6(a) and 6(b), the masks having patterns of A to D illustrated in the figure are used. In this case, each numeral illustrated on the upper side of FIG. 6(b) indicates in which pass, that is, main scanning operation an ink droplet is ejected. When the configuration thus denoted by numerals is decomposed, the ejection positions to which ink droplets are ejected in the first to third main scanning operations performed for each of the ejection position a to d have the patterns as illustrated on the lower side of FIG. 6(b). In this case, the masks A to D are used for the ejection positions a to d, respectively.

Also in this configuration, the mask can be changed appropriately every time the main scanning operation is performed. Furthermore, the same mask can be used appropriately in the main scanning operations corresponding to the same ejection position, for each of the ejection positions a to d. Therefore, with such a configuration, a plurality of masks can be used appropriately while the complementary relation of the ejection position in a plurality of main scanning operations is established easily and appropriately. This also can appropriately prevent the visible pattern corresponding to the pattern of the mask from appearing in the print result.

In the example of the printing operation illustrated in FIGS. 5(a) to 5(c) and FIGS. 6(a) and 6(b), the resolution pass number is four. The resolution pass number, however, is not limited to four and may be changed to another number which is the number of passes.

Figures 7A, 7B, 7C:
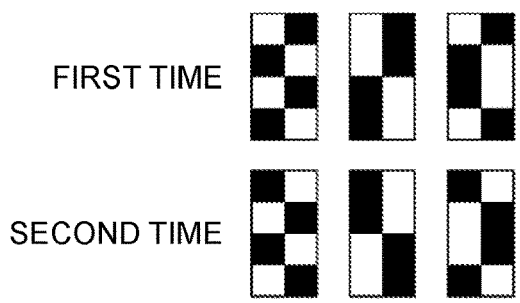

FIGS. 7(a) to 7(c) are diagrams illustrating another specific example of the printing operation performed in the printing apparatus 10, specifically, illustrating an example of the operation in which the resolution pass number is three and printing is performed in six passes. FIG. 7(a) illustrates an example of the resolution pass number.

As described above, in the printing operation illustrated in FIGS. 7(a) to 7(c), the resolution pass number is three. More specifically, as for the ejection positions to which ink droplets are ejected in the printing apparatus 10, when focus is on the ejection positions spaced apart from each other by a distance smaller than the inter-dot distance at the main-scanning resolution, the ejection positions are configured, as illustrated in three patterns a to c in the figure, such that three ejection positions are arranged in a row in the sub scanning direction that is the feed direction, and only one ejection position is present in the main scanning direction that is the scan direction. In this case, ink droplets are ejected to the ejection positions a to c in different main scanning operations. In the case illustrated in FIGS. 7(a) to 7(c), the printing apparatus 10 performs the printing operation in six passes as described above.

FIG. 7(b) illustrates an example of the ejection positions to which ink droplets are ejected in each main scanning operation that is pass when printing is performed in six passes. Also in FIG. 7(b), the numeral in each square indicates the main scanning operation of ejecting an ink droplet to the corresponding ejection position, in the same manner as in FIG. 5(b) and the like.

In this case, since the number of passes of printing is twice the resolution passes, ink droplets are ejected so as to fill the ejection positions corresponding to a to c illustrated in FIG. 7(a) in the main scanning operation performed twice. More specifically, in the case illustrated in FIG. 7(b), ink droplets are ejected to the ejection positions corresponding to the ejection position a in the first and fourth main scanning operations, that is, in the first pass and the fourth pass. Ink droplets are ejected to the ejection positions corresponding to the ejection position b in the second and fifth main scanning operations, that is, in the second pass and the fifth pass. Ink droplets are ejected to the ejection positions corresponding to the ejection position c in the third and sixth main scanning operations, that is, the third pass and the sixth pass. Also in this case, in order to perform the main scanning operation corresponding to the same ejection position separately multiple times, for each of a to c, a mask is used in each main scanning operation.

FIG. 7(c) is a diagram illustrating an example of the patterns of masks. In the case illustrated in FIGS. 7(a) to 7(c), the masks having individual patterns A to C illustrated in the figure are used. In this case, each numeral illustrated on the upper side of FIG. 7(c) indicates in which main scanning operation that is pass an ink droplet is ejected. When the configuration thus denoted by numerals is decomposed, the ejection positions to which ink droplets are ejected in the first and second main scanning operations performed for each of the ejection positions a to c have the pattern as illustrated on the lower side of FIG. 7(c). In this case, the masks A to C are used for the ejection positions a to c, respectively.

Also in this configuration, the mask can be changed appropriately every time the main scanning operation is performed. Furthermore, the same mask can be used appropriately in the main scanning operations corresponding to the same ejection position for each of the ejection positions a to c. Therefore, with such a configuration, a plurality of masks can be used appropriately while the complementary relation of the ejection position in a plurality of main scanning operations can be established easily and appropriately. This also can appropriately prevent the visible pattern corresponding to the pattern of the mask from appearing in the print result.

The result of printing performed by the multi-pass method with the printing apparatus 10 in this example will now be described more specifically. FIGS. 8(a) and 8(b) and FIGS. 9(a) and 9(b) illustrate examples of the print result by the multi-pass method.

Figure 8A:
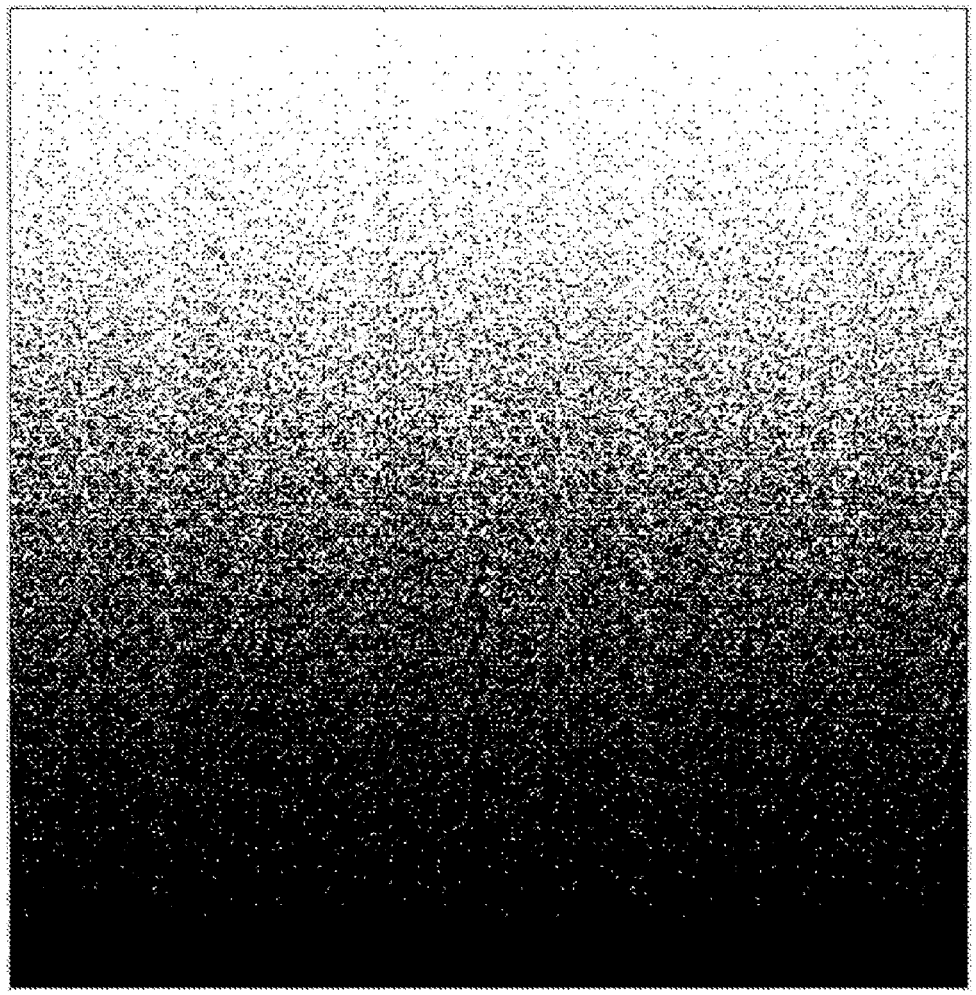
Figure 8B:
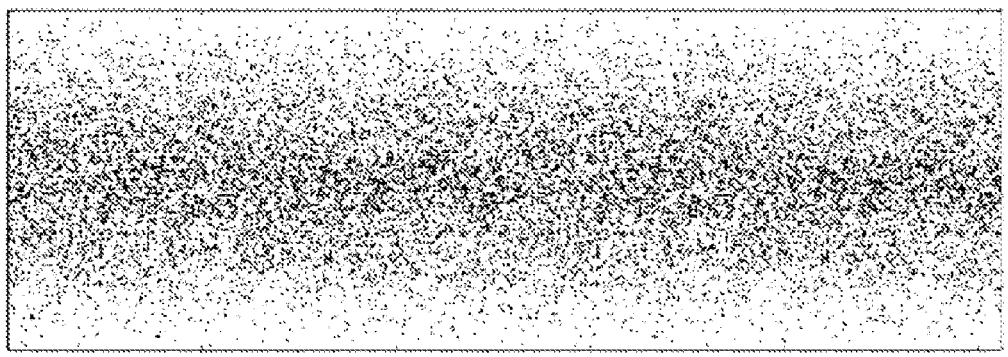

FIGS. 8(a) and 8(b) are diagrams illustrating an example of the result of printing performed by the multi-pass method in a conventional configuration, specifically, illustrating an example of the print result in which when the number of resolution passes is three in the same or similar configuration as in the case illustrated in FIG. 7(a), only one mask is used rather than using different kinds of masks. FIG. 8(a) illustrates an example of the print result. FIG. 8(b) illustrates a mask that is the mask A used in this printing operation. In this case, it is understood that the visible pattern resulting from the pattern of the mask appears in the print result.

Figure 9A:
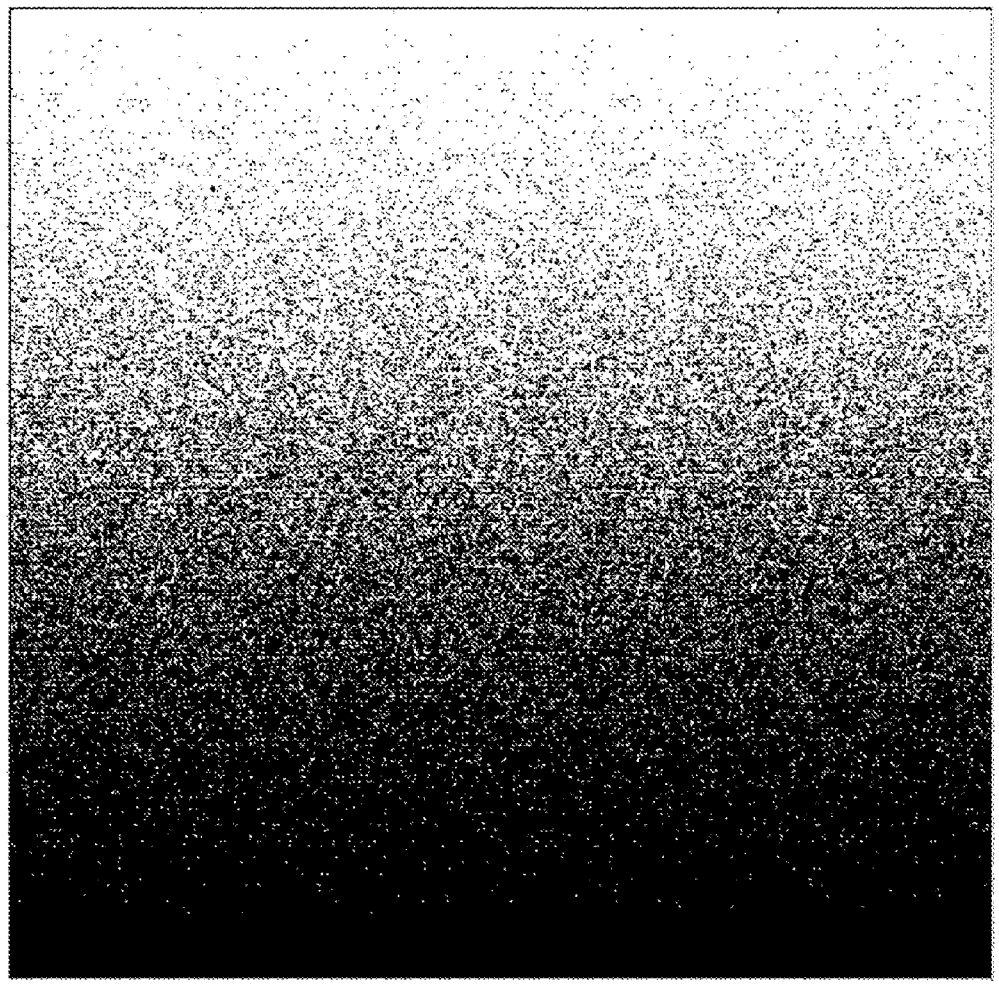
Figure 9B:
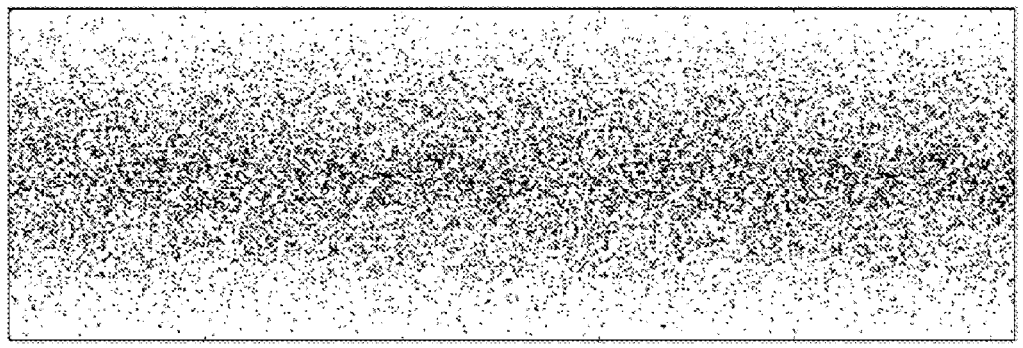

FIGS. 9(a) and 9(b) are diagrams illustrating an example of the result of printing performed by the multi-pass method with the printing apparatus 10 in this example. FIG. 9(a) is a diagram illustrating an example of the print result. FIG. 9(b) is a diagram illustrating a mask used in this printing operation.

In the printing operation illustrated in FIGS. 9(a) and 9(b), the number of resolution passes is three, with the same or similar configuration as in the case illustrated in FIG. 7(a), and different kinds of masks A to C having patterns different from each other are used. The same mask A as the mask illustrated in FIG. 8(b) is used as the mask A. The masks obtained by translating, that is, shifting the pattern of the mask A laterally, that is, in the main scanning direction are used as the masks B and C. More specifically, the mask B is a mask obtained by translating the pattern of the mask A laterally by 85 pixels. The mask C is a mask obtained by translating the pattern of the mask A laterally by 170 pixels. The masks A to C are used in order in individual main scanning operations in the same or similar manner as in the printing operation described with reference to FIGS. 7(a) to 7(c).

The comparison between FIG. 9(b) and FIG. 8(b) suggests that the use of a plurality of such masks can appropriately suppress the occurrence of the visible pattern resulting from the pattern of the mask. That is, the effect of this example can be confirmed appropriately also from these specific results of printing.

Various supplementary descriptions will now be described in connection with the feature of the printing operation performed by the printing apparatus 10 in this example. In the cases described above, the number of passes of printing is an integer. However, the number of passes of printing is not limited to an integer and may be a non-integer including values of decimals.

Figure 10A:
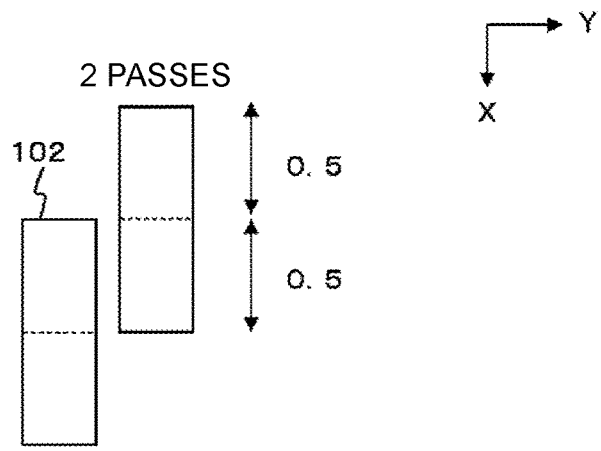
Figure 10B:
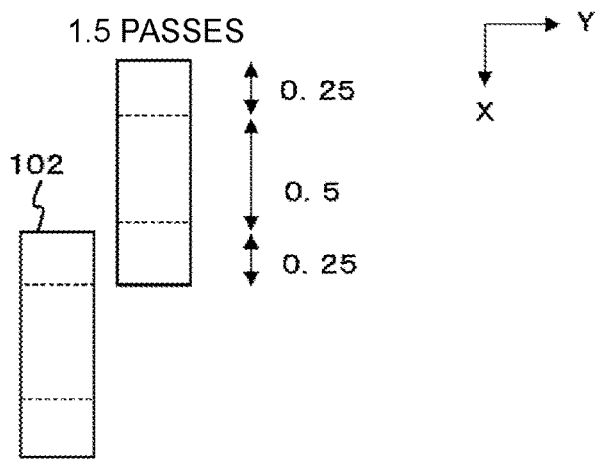
Figure 10C:
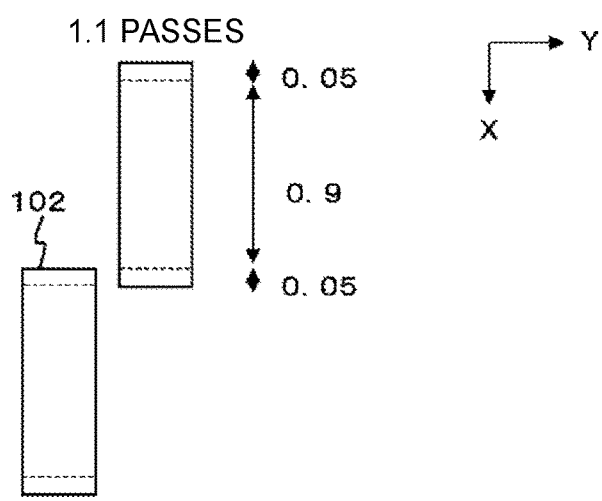

FIGS. 10(a) to 10(c) are diagrams illustrating the number of passes that is an integer and the number of passes that is a non-integer. FIGS. 10(a) to 10(c) illustrate examples of the operation in a typical multi-pass method, where the number of passes is two or less, for simplicity of explanation.

FIG. 10(a) is a diagram illustrating an example of the operation in which the number of passes is an integer, specifically, illustrating the operation in which the number of passes is two, in a simplified form. When the number of passes is two, in each sub scanning operation, the feed amount in the sub scanning direction is set half, that is, 0.5 time the nozzle row length of the inkjet head 102. In this case, the feed amount in the sub scanning direction is the amount of movement by which the inkjet head 102 is moved relative to the medium 50 illustrated in FIGS. 1(a) to 1(c) during the sub scanning operation. The nozzle row length is the length of the nozzle row in the sub scanning direction. With the feed amount set in this way, the inkjet head 102 performs the main scanning operation twice for each position of the medium 50.

FIGS. 10(b) and 10(c) are diagrams illustrating examples of the operation in which the number of passes is a non-integer. FIG. 10(b) illustrates an example of the operation in which the number of passes is 1.5, that is, 1.5 passes. In this case, in each sub scanning operation, the feed amount in the sub scanning direction is set to ¾, which is 0.75 time the nozzle row length. FIG. 10(c) illustrates an example of the operation in which the number of passes is 1.1, that is, 1.1 passes. In this case, in each sub scanning operation, the feed amount in the sub scanning direction is set to 9/10, which is 0.9 time the nozzle row length.

In these cases, as illustrated in the figure, only the position at the end portion of the inkjet head 102 in the sub scanning direction, which is the position in the sub scanning direction, overlaps before and after the sub scanning operation. In the case illustrated in FIG. 10(b), only a region of ¼ that is 0.25 at the end portion of the inkjet head 102 overlaps before and after the sub scanning operation. In the case illustrated in FIG. 10(c), only a region of 1/20 that is 0.05 at the end of the inkjet head 102 overlaps before and after the sub scanning operation. As a result, the number of passes of printing in these operations is a non-integer value, such as 1.5 and 1.1.

Here, when the number of passes of printing is a non-integer, the ratio that is duty of the ejection positions to which ink droplets are ejected in one main scanning operation differs between the end portion of the inkjet head 102 overlapping before and after the sub scanning operation, and the other portion. Therefore, in the cases illustrated in FIGS. 10(b) and 10(c), in each main scanning operation, the mask is applied only to the end portion of the inkjet head 102 so that ink droplets are ejected only to part of ejection positions selected by the mask. In this case, no mask may be applied to the portion other than the end, and ink droplets may be ejected to all of the ejection positions to which ink can be ejected in the corresponding main scanning operation.

The non-integer number of passes is not limited to those illustrated in FIGS. 10(b) and 10(c), and the number of passes greater than two may be set. Also in this case, the duty may be differentiated between the end of the inkjet head 102 and the other portion, so that the number of passes can be set to various non-integers.

Also when the number of passes is a non-integer, if the number of passes is greater than the resolution pass number, ink droplets are ejected in accordance with a mask in each main scanning operation, in the same or similar manner as in the case described with reference to, for example, FIGS. 1(a) to 8(b). Then, also in this case, the occurrence of the visible pattern resulting from the pattern of the mask can be suppressed by using different kinds of masks. Also in this case, the occurrence of the visible pattern resulting from the pattern of the mask can be suppressed more appropriately by using masks of different kinds as many as the resolution pass number.

The problem of the occurrence of the visible pattern corresponding to the pattern of a mask may arise not only when masks are applied to all of the nozzles in the nozzle row but also when masks are applied only to a nozzle at the end of the nozzle row, for example, when printing is performed with the number of passes that is a non-integer less than two. Therefore, also in such a case, it is preferable to use different kinds of masks.

Such a configuration is generalized more broadly as follows. In each main scanning operation, for at least part of ejection positions serving as ejection targets of ink droplets in the main scanning operation, a mask that selects part of the at least part of ejection portions is used, and the inkjet head 102 ejects an ink droplet to the ejection position specified by the mask, in accordance with the mask. Then, in this case, the inkjet head 102 ejects an ink droplet in accordance with a preset first mask in the main scanning operation at one time, and the inkjet head 102 ejects an ink droplet in accordance with a second mask that selects an ejection position in a pattern different from that of the first mask, in the main scanning operation at another time different from the one time. With such a configuration, the occurrence of the visible pattern resulting from the pattern of the mask can be suppressed appropriately.

Other modifications of the configuration of the printing apparatus 10 will now be described. In the printing apparatus 10 having the configuration illustrated in FIGS. 1(a) to 1(c), the head 12 includes the inkjet heads 102. Each of the inkjet heads 102 ejects ink droplets of a color, such as yellow, magenta, cyan, and black (Y, M, C, and K) for color printing. In this case, the printing operation in the multi-pass method described above is performed for each color.

The ink for use in the printing apparatus 10 is not limited to inks of the above-noted colors, and inks of various colors may be used. More specifically, ink of a special color, such as white and clear, may be additionally used.

Figure 11:
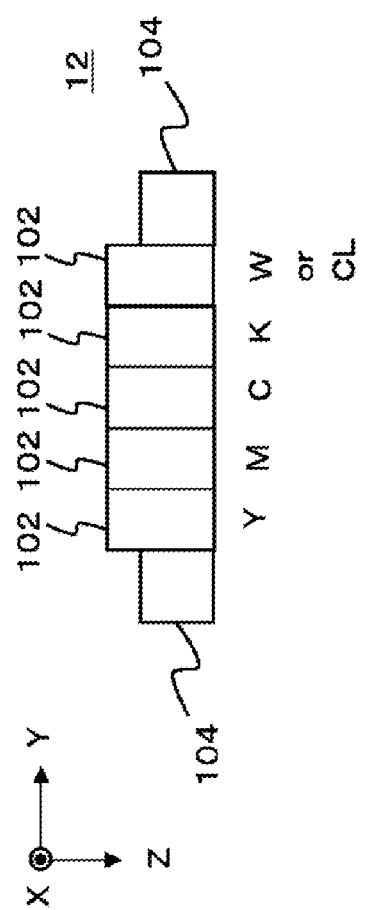
FIG. 11 illustrates a modification of the configuration of the head 12.

FIG. 11 illustrates a modification of the configuration of the head 12. In FIG. 11, the components denoted by the same reference signs as in FIGS. 1(a) to 1(c) and the like have the same or similar features as the components in FIGS. 1(a) to 1(c) and the like, except for the points described below.

In this modification, the head 12 includes an inkjet head 102 for a special color, in addition to the inkjet heads 102 for colors Y, M, C, and K. The inkjet head 102 for special color ejects ink droplets of white (W) or clear (CL). The clear ink refers to colorless and transparent ink. Also in such a configuration, the occurrence of the visible pattern resulting from the pattern of the mask can be suppressed appropriately by performing the printing operation by the multi-pass method in the same or similar manner as in the cases described with reference to FIGS. 1(a) to 10(c).

Here, in the configuration illustrated in FIG. 11, the inkjet heads 102 ejecting ink droplets of colors Y, M, C, and K are an example of color heads. In this case, the color heads refer to inkjet heads ejecting ink droplets of color inks, which are inks for color print. In this case, the inkjet heads 102 ejecting ink droplets of colors Y, M, and C, which are chromatic color inks, of Y, M, C, and K may be considered as color heads.

The inkjet head 102 for special color, such as white (W) or clear (CL), is an example of non-color head. In this case, the non-color head refers to an inkjet head ejecting ink droplets of a color different from color inks. The color different from color inks may be a color other than basic colors that are process colors for color representation.

When ink of special color is used, it may be desired that the ink of special color is printed in a density different from that of color ink. When clear ink is used, it may be desired to make a print in a density higher than that of color ink in order to make a print with high glossiness. For example, when a layer serving as an underlayer of an image is formed using white ink, it may also be desired to make a print in a density higher than that of color ink. Therefore, when a color head and a non-color head are used as in the configuration illustrated in FIG. 11, the density of print may be differentiated between those heads.

Such a setting of density is applicable not only when the printing apparatus 10 in this example is used as described with reference to FIGS. 1(a) to 10(c), broadly speaking, applicable also when printing is performed by an inkjet scheme more broadly. Then, we will describe below an example of the setting of density of printing not only when the printing apparatus 10 in this example is used but also when a color head and a non-color head are used in a more general configuration in which prints are made by an inkjet scheme.

When printing is performed by an inkjet scheme, in the typical printing operation, printing is performed to attain a density of 100% at maximum for all the colors used. In this case, a density of 100% means a density in which an ink droplet is jetted only once to the position of one pixel, where one pixel=one shot. In this case, in order to make a print at a density higher than 100%, overprinting is performed such that the density is N×100% for all the colors used in printing. In this case, N is an integer equal to or greater than two. In this case, a density of N×100% refers to the density in which an ink droplet is jetted N times to the position of one pixel, where one pixel=N shots. In this case, however, even when the amount of ink only for ink of a certain color, such as special color, is intended to be increased, printing is performed at a density of N×100% for all of the colors by performing overprinting.

When the density of only a certain color is intended to be increased with the densities of other colors kept, the density of printing in other colors may be reduced through adjustment such as RIP processing. However, in this case, the locations to place dots of ink are reduced, which causes degradation in image quality such as deterioration of granularity. More specifically, when 100 dots of ink are placed in a unit area, 100 locations that are pixels are filled without overprinting. However, when overprinting is performed twice, the amount of ink that is the density is adjusted so that two dots are placed in each of 50 locations. Then, in this case, the former case generally achieves higher image quality.

In this respect, the inventor of the subject application has conducted elaborate studies and arrived at the idea of increasing the density by a factor of N only for a certain color, such as special color, rather than increasing the density by a factor of N for all of the colors. In this case, N is an integer equal to or greater than two. More specifically, in this case, while the maximum density of printing by a color head is kept at 100%, the density is increased to N×100% only for the density of printing by at least part of the non-color heads. In this case, as for the density of printing in a special color such as white and clear, ink droplets may be jetted N times to the position of one pixel, so that printing is performed at a density of N×100%, such as 200%. Printing in such a density can be performed by overprinting only for a certain color.

The inventor of the subject application has observed the print result with such a setting of density using an actual inkjet printer. More specifically, printing was performed such that the density of printing by the non-color head for clear color is 200% where one pixel=two shots, while the density of printing by a color head is kept at 100% where one pixel=one shot. It has been found that when printing is performed once at a resolution of 600×600 dpi or 600×900 dpi, a print with sufficient glossiness can be made with color ink, without impairing the image quality of color printing. That is, with such a configuration, printing at a high density can be performed appropriately with clear ink while the effect on the result of color printing is suppressed. This also can appropriately increase the glossiness of the print result with clear ink.

When the printing density is higher, for example, 1200×1200 dpi, sufficient glossiness may be obtained without overprinting of clear ink. Therefore, in such a case, clear ink may also be printed at a density of 100%.

Printing in such a high density can also be performed appropriately when white ink is used, in the same or similar manner as when clear ink is used. That is, with such a configuration, printing at a high density can be performed appropriately with, for example, white ink while the effect on color printing is suppressed. Thus, for example, when a layer of white ink is formed as an underlayer so that the backside of a region to be subjected to color printing is opaque, the layer of white ink can be made opaque more appropriately.

When the density of printing with clear or white ink is to be increased, we may simply think that the density may not necessarily be N×100% but may be in increments other than an integer multiple of 100%, such as 125% and 150%. However, in this case, it is necessary to change masks in accordance with the density to be set, and the process may be complicated. More specifically, in this case, it is necessary, for example, to adjust a mask in accordance with the density, using a binarizing mask to specify dots of ink to be formed in each main scanning operation and a duty changing mask to select dots in accordance with the density. In this case, since the density is adjusted by adjusting a mask, unevenness may occur based on the pattern of the mask.

By contrast, when only the density of printing in a certain color is increased to N×100% as described above, there is no need for changing the mask. This enables printing at a higher density with simpler control. More specifically, in this case, the same mask as in printing at 100% can be used, for example, as a binarizing mask.

Furthermore, unevenness as described above is not caused by adjustment of density. Therefore, with such a configuration, the density of printing in a certain color can be increased more appropriately.

We can generalize such a configuration more broadly as follows: when the density of printing in which an ink droplet is ejected to the position of each of pixels arranged in a row at a printing resolution is 100%, the non-color head ejects an ink droplet multiple times to the position of each pixel, so that the non-color head performs printing at a density of 100%×N. In this case, N is an integer equal to or greater than two. In this case, the color head performs printing at a density equal to or lower than 100%. With such a configuration, the density of printing in a certain color can be increased appropriately.

INDUSTRIAL APPLICABILITY

The present invention can be suitably used for printing apparatuses.

The invention claimed is:

1. A printing apparatus configured to perform printing on a medium by an inkjet scheme, comprising:
an inkjet head, configured to eject an ink droplet by the inkjet scheme;
a main scan driver, configured to cause the inkjet head to perform a main scanning operation of ejecting the ink droplet while moving relative to the medium in a preset main scanning direction;
a sub scan driver, configured to cause the inkjet head to perform a sub scanning operation of moving relative to the medium in a sub scanning direction orthogonal to the main scanning direction; and
a controller, configured to control operation of the main scan driver and the sub scan driver to perform the main scanning operation a plurality of times on each ejection region on the medium, wherein
the inject head has a nozzle row in which a plurality of nozzles are arranged in the sub-scanning direction,
in one sub scanning operation subsequent to one main scanning operation, a feed amount in the sub scanning direction is a distance that is shorter than a length of the nozzle row,
an ejection region for ejecting the ink droplet at a subsequent main scanning operation of the one main scanning operation at least partially overlaps with an ejection region for ejecting the ink droplet at the one main scanning operation,
a duty that is a ratio of ejection positions to which the ink droplets are ejected in each of the main scanning operations is different between an overlapping region and non-overlapping region,
wherein the controller sets the overlapping region that is the ejection region overlapped with each other and the non-overlapping region that is the ejection region not overlapped with each other when performing the main scanning operation of ejecting the ink droplet each time according to a number of passes of the inkjet head,
wherein when the number of passes is a non-integer number smaller than 2, the ink droplets are ejected using a plurality of masks having irregular mask patterns in the ejection positions in the overlapping region,
wherein the ink droplets are ejected without applying a mask in the non-overlapping region, and the ratio of the ejection positions for ejecting the ink droplets is different from the overlapping region.

2. The printing apparatus according to claim 1, wherein the controller comprises:
in each of the main scanning operations, using a mask that selects part of the at least part of the ejection positions serving as ejection targets of the ink droplets in the main scanning operation, the inkjet head ejects the ink droplet to the ejection positions specified by the mask.

3. The printing apparatus according to claim 2, wherein the ink droplet is ejected by using a different type of the mask for each overlapping region.

4. The printing apparatus according to claim 3, wherein a plurality of types of masks having different patterns are used in the main scanning operation a plurality of times, and the plurality types of masks are obtained by shifting predetermined patterns in parallel by different distances from each other.

5. The printing apparatus according to claim 2, wherein in the overlapping region, the mask used in the one main scanning operation is in a complementary relation with the mask used in the subsequent main scanning operation.

6. The printing apparatus according to claim 1, wherein the ink droplet is ejected by using a different type of the mask for each overlapping region.

7. The printing apparatus according to claim 6, wherein in the overlapping region, the mask used in the one main scanning operation is in a complementary relation with the mask used in the subsequent main scanning operation.

8. The printing apparatus according to claim 6, wherein a plurality of types of masks having different patterns are used in the main scanning operation a plurality of times, the plurality types of masks are obtained by shifting predetermined patterns in parallel by different distances from each other.

9. The printing apparatus according to claim 1, wherein in the overlapping region, the mask used in the one main scanning operation is in a complementary relation with the mask used in the subsequent main scanning operation.

* * * * *